United States Patent
Schaeffer (10) Patent No.: US 8,930,046 B2
(45) Date of Patent: Jan. 6, 2015

(54) DERIVED RATE MONITOR FOR DETECTION OF DEGRADATION OF FUEL CONTROL SERVO VALVES

(75) Inventor: Joseph M. Schaeffer, Cedar Hill, TX (US)

(73) Assignee: Textron Innovations Inc., Providence, RI (US)

( * ) Notice: Subject to any disclaimer, the term of this patent is extended or adjusted under 35 U.S.C. 154(b) by 430 days.

(21) Appl. No.: 13/297,416

(22) Filed: Nov. 16, 2011

(65) Prior Publication Data

US 2013/0124016 A1   May 16, 2013

(51) Int. Cl.
  *G05B 23/02*  (2006.01)
  *F16K 37/00*  (2006.01)

(52) U.S. Cl.
  CPC ........ *G05B 23/0221* (2013.01); *F16K 37/0075* (2013.01)
  USPC ............ 701/3; 701/29.9; 701/30.4; 701/32.1; 340/683

(58) Field of Classification Search
  None
  See application file for complete search history.

(56) References Cited

U.S. PATENT DOCUMENTS

| | | | | |
|---|---|---|---|---|
| 4,159,444 | A | * | 6/1979 | Bartlett et al. ................. 318/564 |
| 4,826,110 | A | * | 5/1989 | Le ................................ 244/194 |
| 5,319,296 | A | * | 6/1994 | Patel ............................. 318/611 |
| 6,138,810 | A | * | 10/2000 | Fujii et al. ................... 192/85.01 |
| 6,532,392 | B1 | | 3/2003 | Eryurek et al. |
| 6,999,853 | B2 | * | 2/2006 | Junk et al. ..................... 700/282 |
| 8,234,037 | B2 | * | 7/2012 | Goupil et al. ................. 701/33.9 |
| 2007/0276575 | A1 | | 11/2007 | Zheng |
| 2011/0260085 | A1 | * | 10/2011 | van der Zee et al. ..... 251/129.15 |
| 2013/0327426 | A1 | * | 12/2013 | Nomiyama et al. .......... 137/551 |

FOREIGN PATENT DOCUMENTS

WO    2011135155 A1    11/2011

OTHER PUBLICATIONS

Extended European Search Report from Application 11195392.3-1239 issued from the European Patent Office dated Apr. 16, 2012.

* cited by examiner

*Primary Examiner* — Redhwan K Mawari
*Assistant Examiner* — Edward Torchinsky
(74) *Attorney, Agent, or Firm* — James E. Walton; Damon R. Hickman (57) ABSTRACT

A system for detecting degradation of a servo valve; having a controller, a servo valve, a position sensor, and a rate monitor. The controller receives inputs and transmits command data. The servo valve has an actuator and is conductively coupled to the controller to receive command data from the controller and move the actuator in response to the command data. The position sensor operably associated with the servo valve for measuring movement of the actuator and transmits corresponding movement data to the controller. The rate monitor coupled to the controller and position sensor for receiving the command data and the movement data as inputs respectively. The rate monitor processes the inputs to produce a steady state rate error signal. The rate monitor compares the steady state rate error signal to selected operational limits and produces a telemetry output when the operational limits are exceeded.

20 Claims, 5 Drawing Sheets

DERIVED RATE MONITOR FOR DETECTION OF DEGRADATION OF FUEL CONTROL SERVO VALVES

BACKGROUND

1. Field of the Invention

The present application relates generally to electro-hydraulic servo loops, in particular, to the detection of faults and degradation in servo loops.

2. Description of Related Art

Servo-valves have been around for many years. Servo valves are used in many applications, such as the delivery of fuel to a helicopter engine. Servo valves are typically configured to move an actuator allowing fuel to be dispersed in an engine. Actuators in the servo valve can degrade over time and wear. At such times, the actuators typically fail to perform as required or expected.

Different methods have been utilized to measure when the hydraulic servo valve has degraded. A position sensor may be used to compare the actual measured position to the predicted position of the hydraulic servo valve based on a model of the closed loop dynamics. The disadvantage of this method is that significant degradations can sometimes result in only subtle differences in the position sensor value. Thus, detecting failures may often require major degradation.

Additionally, a persistence monitor may be used to detect degradation of fuel servo valves. A persistence monitor typically requires a failure to be true for a specified period of time. The disadvantage of this system is that it is often not robust enough to detect oscillatory failures where the monitor value will intermittently exceed the threshold.

Additional monitors and instruments may be added at intermediate stages of the hydraulic servo valve in an attempt to detect such failures, however, this method often requires additional wires/interface, resulting in a weight, space, and complexity increase. Even with the additional instrumentation, a method of detecting oscillatory failures still needs to be defined.

Although great strides have been made in detecting degradation of servo valves, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
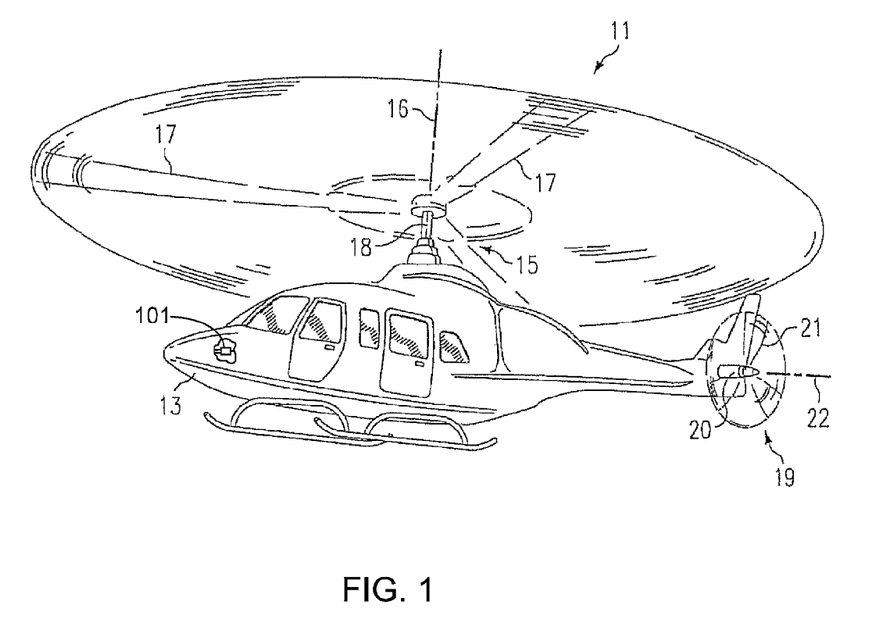
FIG. 1 is a perspective view of a derived rate monitor system located within the body of an aircraft according to the preferred embodiment of the present application.

Referring to FIG. 1 in the drawings, an aircraft, such as a helicopter 11, having a derived rate monitor system 101 is illustrated. Helicopter 11 has a body 13 and a main rotor assembly 15, including main rotor blades 17 and a main rotor shaft 18. Helicopter 11 has a tail rotor assembly 19, including tail rotor blades 21 and a tail rotor shaft 20. Main rotor blades 17 generally rotate about a longitudinal axis 16 of main rotor shaft 18. Tail rotor blades 21 generally rotate about a longitudinal axis 22 of tail rotor shaft 20. Helicopter 11 also includes derived rate monitor system 101 within body 13 according to the present disclosure for detecting the degradation of electro hydraulic servo valves on helicopter 11.

Although described as using system 101 with helicopter 11, it is understood that system 101 may be used on any aircraft such as, fixed wing aircraft and tilt-rotor aircraft, for example. Furthermore, system 101 is not so limited to aircraft. It is understood that system 101 is configured to be used outside of aircraft to detect degradation of servo valves used in other applications. For purposes of this application, discussion will focus on detection of degradation of fuel control servo valves used to deliver fuel to the engines to turn blades 17 and 21

Figure 2:
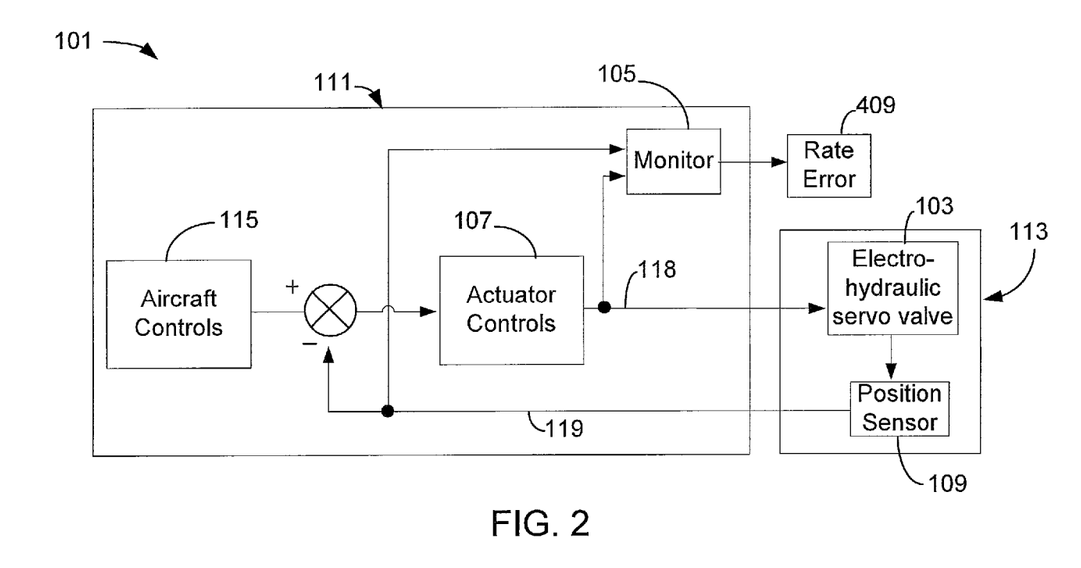
FIG. 2 is a schematic of the derived rate monitor system of FIG. 1 for a fuel control valve in the aircraft.

Referring now also to FIG. 2 in the drawings, derived rate monitor system 101 is illustrated. System 101 includes a controller to receive inputs and send data to external devices in an efficient and systematic way. An example of a controller is a flight control computer 111 or a general purpose computer. For purposes in this application, flight control computer 111 will be used to represent the controller to describe the preferred embodiment. System 101 also includes a fuel control unit 113 and a rate monitor 105.

Flight control computer 111 is configured to receive operational commands or inputs from a pilot or other sub-system, such as, but not limited to, mechanical, hydraulic, or electrical systems operably connected to the aircraft. Flight control computer 111 processes these inputs and generates the requisite commands to affect flight characteristics and performance of the aircraft. A portion of the generated commands are sent to fuel control unit 113 to regulate the flow of fuel to the engine.

System 101 is configured to measure actuator performance of an electro hydraulic servo valve 103, located within fuel control unit 113, and signal a failure when performance has been degraded. Degradation occurs when the actuator within servo valve 103 fails to respond as expected. Actuator performance is analyzed in rate monitor 105 by comparing the expected rate response derived from an actuator controls 107 to the actual derived rate response derived from a position sensor 109. When the derived rate response differs from the expected rate according to a prescribed limit, servo valve 103 is considered degraded.

Flight control computer 111 includes aircraft controls 115 and actuator controls 107. Flight control computer 111 is in continual communication with various systems and sub-systems within helicopter 11. Aircraft controls 115 receive inputs and interpret commands from the pilot and/or sub-system. Aircraft controls 115 issues commands necessary to comply with desired inputs. Actuator controls 107 receive commands from aircraft controls 115 and issues command data 118 to servo valve 103. As seen in FIG. 2, command data 118 is communicated to servo valve 103 and to rate monitor 105. Command data 118 is an electrical impulse wherein the current of the impulse varies. The level of current in the electrical impulse affects the operation of fuel control valve 113 and the actuator. Command data 118 correlates to an expected response of the actuator within servo valve 103. Rate monitor 105 is operably coupled to flight control computer 111, being integrated into existing software programming or by external components via wired or wireless communications. Although rate monitor 105 is depicted as being within flight control computer 111 in FIG. 2, it is understood that rate monitor 105 may be located separate from flight control computer 111, as such rate monitor 105 is part of system 101 and optionally part of the controller.

Figure 3:
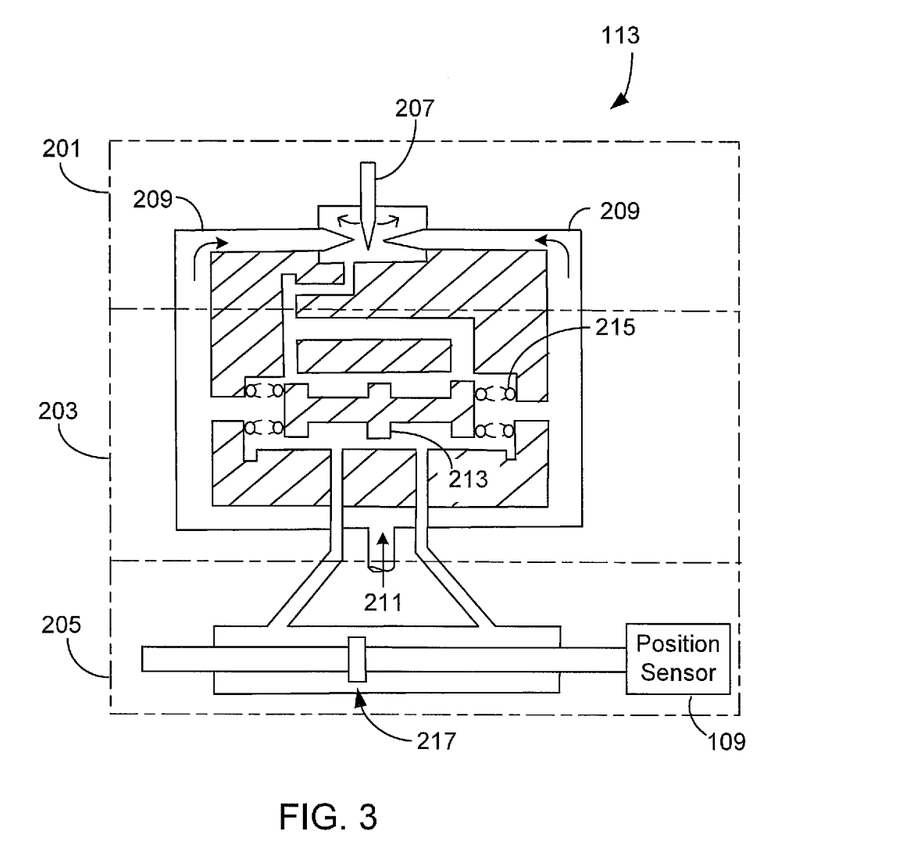
FIG. 3 is a partial schematic of a hydraulic servo valve used in the derived rate monitor system of FIG. 1.

Referring now also to FIG. 3 in the drawings, a partial schematic of electro hydraulic servo valve 103 is illustrated. Operation and construction of servo valves are understood to one of ordinary skill in the art. FIG. 3 serves as a simplified illustration of one type of embodiment of servo valve 103. It is understood that other embodiments are possible. System 101 is operable with any number and types of servo valves.

Servo valve 103 includes three stages: a first stage 201, a second stage 203, and a third stage 205. First stage 201 includes a flapper 207 and is configured to receive the sensed inputs or command data 118 from actuator controls 107 in flight control computer 111 and operate flapper 207. Flapper 207 is positioned between a plurality of flowing tubes 209. Flowing tubes 209 are provided with a supply pressure 211. As flapper 207 receives command data 118 from actuator controls 107, flapper 207 is configured to move so as to impede or aid flow through flowing tubes 209. Movement of flapper 207 forms a pressure differential within flowing tubes 209 and thereby against a spool valve 213.

Spool valve 213 is located within second stage 203 where no sensors are located. Spool valve 213 operably responds to the pressure differential generated by flapper 207 and moves against a plurality of centering springs 215. As spool valve 213 is moved, fluid is ported to an actuator 217 in third stage 205.

Third stage 205 relates to the sensed outputs of servo valve 103. Actuator 217 translates in relation to the fluid being ported from the movement of spool valve 213. The flow of fluid ported to actuator 217 is proportional to command data 118 applied to flapper 207. Therefore, command data 118 controls the rate and direction of actuator 217. Position sensor 109 is operably coupled to actuator 217 so as to measure the movement of actuator 217.

Position sensor 109 is configured to measure the movement of actuator 217 and communicate such movement information back to flight control computer 111 in the form of a movement data 119, as seen in FIG. 2. In particular, movement data 119 is communicated to several locations including rate monitor 105 and actuator controls 107. Position sensor 109 is not limited to any one particular type of unit. It is understood that other embodiments of system 101 may be configured to use a position sensor, such as, a linear variable differential transducer, a rotary variable differential transducer, an incremental or absolute encoder, or a linear or rotary potentiometer, to name a few. Since second stage 203 has no sensors, determining if the actuator performs as expected is done by comparing how the actuator should have responded through command data 118 to that of how the actuator actually responded through movement data 119.

Figure 4:
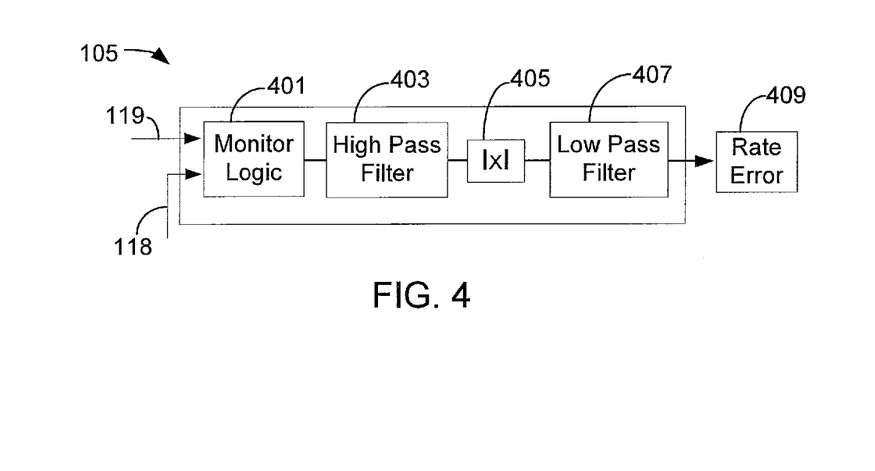
FIG. 4 is an enlarged view of a rate monitor in the rate monitor system of FIG. 1.

Referring now also to FIG. 4 in the drawings, an enlarged schematic of rate monitor 105 is illustrated. Rate monitor 105 is configured to have similar through-put requirements of position sensor 109. Furthermore, rate monitor 105 is configured to utilize existing outputs such as command data 118 and measurement data 119, of other modules or components of system 101. Therefore, rate monitor 105 is configured to use existing software and programming of flight control computer 111 requiring minimal software or programming modifications from existing flight control computers. Rate monitor 105 may include additional components such as capacitors, resistors, and circuitry, for example, in addition to existing flight control computer 111 hardware. As such, rate monitor 105 may be incorporated into existing flight control computers as a retrofit to form system 101. Additionally, rate monitor 105 may be installed during original manufacture of the aircraft.

Rate monitor 105 detects oscillatory failures of servo valve 103 by deriving inner loop parameters involving command data 118 and movement data 119, such that command data 118 and movement data 119 are communicated to rate monitor 105 as inputs. An outer loop parameter is created by communicating movement data 119 directly to actuator controls 107 as an input. The outer loop parameter is self-correcting, allowing actuator controls 107 to adjust command data 118 based upon movement data 119 from position sensor 109.

Rate monitor 105 includes monitor logic 401, a high pass filter 403, a non-linear element 405, and a low pass filter 407. Monitor logic 401 receives command data 118 and movement data 119 as inputs. Monitor logic 401 includes selected circuitry and software to process, derive, and analyze data 118 and 119 to produce an oscillatory rate error signal. Monitor logic 401 calculates the expected response from command data 118 based on fuel control unit 113 null current value and baseline flow gain. Null current is defined for each fuel control unit 113 and adjusted based on flight test results or other criteria. Null current may vary over the lifetime of the aircraft. Monitor logic 401 derives an expected rate response from the expected response, and an actual derived rate response from movement data 119. Monitor logic 401 uses similar fuel control null current/hysteresis tolerances as position sensor 109. The expected rate response and actual derived rate response is analyzed by monitor logic 401 to form the oscillatory rate error signal.

The filtering process includes high pass filter 403, non-linear element 405, and low pass filter 407. Rate monitor 105 uses one or more first order filters, such as low pass filter 407 and high pass filter 403, for example. The filters transform the oscillatory rate error signal passing through rate monitor logic 401 into a steady state rate error signal. First order filters transform the oscillatory rate error signal into a steady state gain rather than as sinusoids as seen with second order filters. This configuration allows for simplified fault detection of servo valve 103. Although described using selected filters 403 and 407, it is understood that other filters may be used within rate monitor 105 without departing from the spirit and scope of the application.

The oscillatory rate error signal is sent through high pass filter 403 to eliminate steady state mismatches due to normal variations and center the error about zero. High pass filter 403 is most effective at frequencies greater than twice the natural frequency of high pass filter 403. For example, high pass filter 403 may have a time constant of eight seconds that corresponds to a frequency of 0.125 rad/sec. Rate monitor 105 would then reliably detect oscillatory failures of frequencies greater than 0.25 rad/sec, or 0.04 Hz. It is understood that high pass filter 403 may be used at other frequencies than that described.

The oscillatory rate error signal is sent through a non-linear element 405, such as an absolute value, for example, and also low pass filter 407. Non-linear element 405 operates on the oscillatory rate error signal so as to convert negative values to positive values. Non-linear element 405 and low pass filter 407 combine together to transform the oscillatory rate error signal into a steady state rate error signal. Steady state rate error signal 409 has an advantage of being easier to detect than oscillatory signals. As such, nuisance trips may also be reduced due to short transient excursions of the rate error signal.

Rate error signal 409 is analyzed against prescribed acceptable operational limits of error designated within system 101 concerning servo valve 103. If error signal 409 exceeds acceptable operational limits defined within flight control computer 111, system 101 produces additional telemetry outputs, such as, a fail flag to notify the pilot that degradation of servo valve 103 has occurred. The telemetry output may be, but not limited to, a warning light, a noise, an indicator, or a textual message to the operator of the aircraft within the cockpit. System 101 may be configured to produce additional outputs based upon rate monitor 105.

Rate monitor 105 is configured to be enabled and disabled at selected times. The enabling and disabling of rate monitor 105 may be done manually by an operator or automatically by the controller, such as flight control computer 111. For instance, the pilot may manually turn on or off the rate monitor by turning a switch or selecting an option from a digital display. Additionally, rate monitor 105 may automatically enable and disable itself during selected times of operation. For example, in the instance where servo valve 103 is used to introduce fuel into an engine, rate monitor 105 may be disabled during start up and shut down procedures.

Furthermore, system 101 is configured to compensate for remote failures between multiple flight control computers 111. One or more flight control computers 111 may be operative and in communication with each other on helicopter 11 at any one time. Failure of a single flight control computer 111 may affect the expected rate response and actual derived rate response of servo valve 103 of other flight control computers 111, thereby causing mismatches in error signal 409. System 101 is configured to not disengage as a result for temporary mismatches in error signal 409 due to failures of other flight control computers 111. However, in such instances, rate monitor 105 may be temporarily disabled for a predetermined time according to design methodology and constraints used with position sensor 109. It is understood that system 101 may include one or more flight control computers 111, rate monitors 105, and fuel control units 113.

Figure 5:
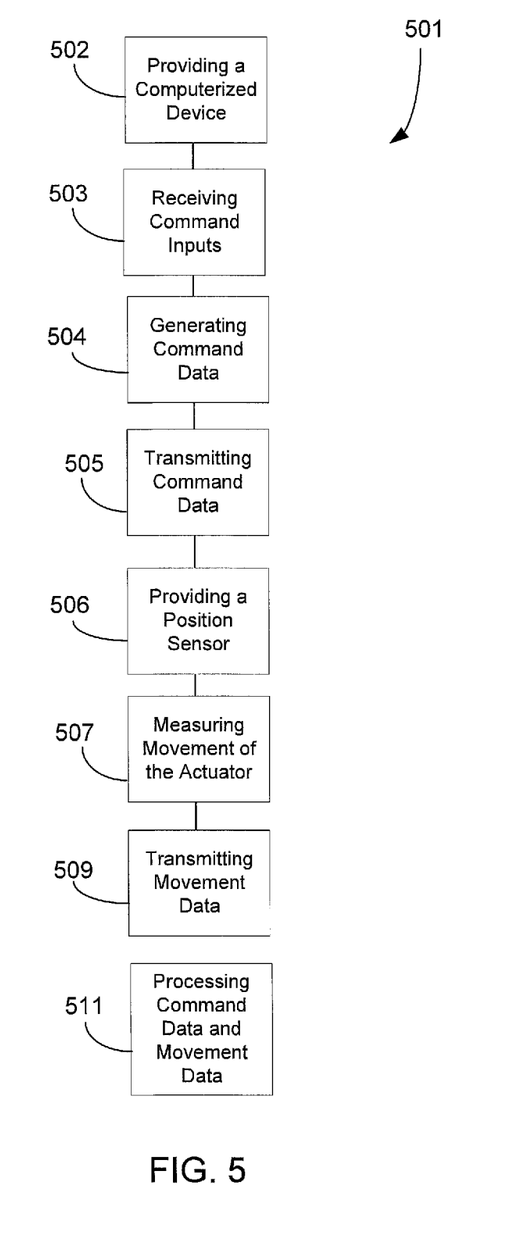
FIG. 5 is a schematic of a method of detecting degradation of a servo valve in the fuel control valve of FIG. 2 with the derived rate monitor system of FIG. 1.

Referring now also to FIG. 5 in the drawings, a schematic of a method 501 of detecting degradation of servo valve 103 is illustrated. In operation of system 101, a controller is provided 502 to receive command inputs 503 from a user or other sub-system. The inputs are analyzed and command data 118 is generated 504 and transmitted 505 to a servo valve, such as servo valve 103. Command data 118 is also transmitted 505 to rate monitor 105. A position sensor is provided 506 to measure 507 the movement of the actuator within the servo valve. The position sensor transmits 509 movement data 119 to rate monitor 105. Rate monitor 105 processes 511 command data 118 and movement data 119 so as to produce an expected rate response from command data 118 and an actual derived rate response from movement data 119. Rate monitor compares the actual derived rate response with the expected rate response and produces the oscillatory rate error signal. Rate monitor 105 filters the oscillatory rate error signal through a plurality of first order filters and generates a steady state rate error signal 409.

Figure 6:
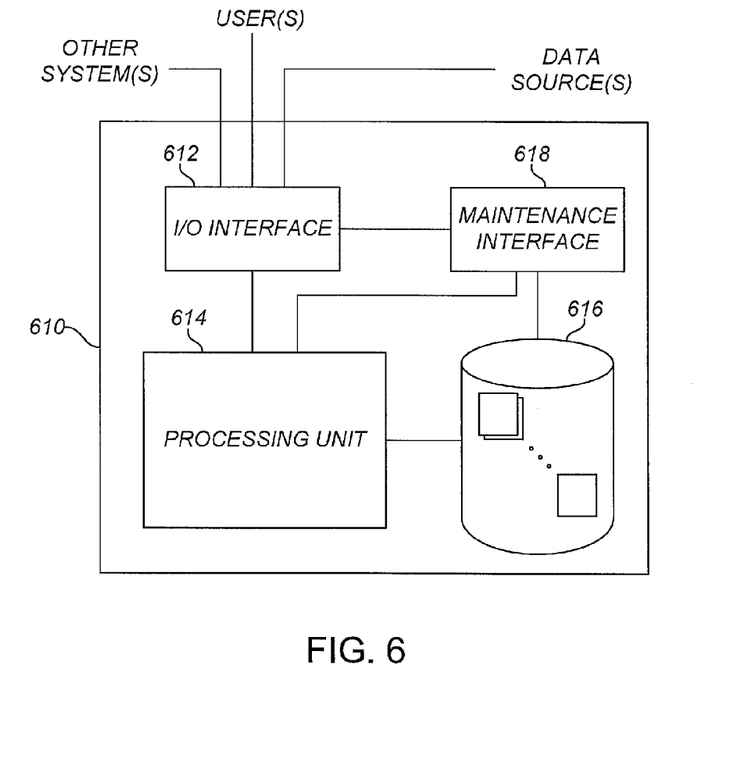
FIG. 6 is an exemplary view of a computer used in the derived rate monitor system of FIG. 2.

Referring now also to FIG. 6 in the drawings, an operational computer 610 is illustrated. Although described using flight control computer 111, it is understood that other computers may be used for use with servo valves on or off an aircraft. FIG. 6 illustrates an exemplary operational computer 610 for processing, deriving, and analyzing information; receiving inputs from selected sources; and distributing command data 118 to external devices, such as servo valve 103.

Operational computer 610 includes an input/output (I/O) interface 612, a processing unit 614, a database 616, and a maintenance interface 618. Alternative embodiments can combine or distribute the input/output (I/O) interface 612, processing unit 614, database 616, and maintenance interface 618 as desired. Embodiments of operational computer 610 can include one or more computers that include one or more processors and memories configured for performing tasks described herein below. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers includes a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

I/O interface 612 provides a communication link between external users, systems, and data sources and components of operational computer 610. I/O interface 612 can be configured for allowing one or more users to input information to operational computer 610 via any known input device. Examples can include a keyboard, mouse, touch screen, microphone, and/or any other desired input device. I/O interface 612 can be configured to send data, such as command data 118, to one or more users from operational computer 610 via any known output device. Examples can include a display monitor, a printer, a speaker, and/or any other desired output device. I/O interface 612 can be configured for allowing other systems to communicate with operational computer 610. For example, the I/O interface 612 can allow one or more remote computer(s) to access information, input information, and/or remotely instruct operational computer 610 to perform one or more of the tasks described herein. I/O interface 612 can be configured for allowing communication with one or more remote data sources. For example, I/O interface 612 can allow one or more remote data source(s) to access information, input information, and/or remotely instruct operational computer 610 to perform one or more of the tasks described herein.

Database 616 provides persistent data storage for operational computer 610. While the term "database" is primarily used, a memory or other suitable data storage arrangement may provide the functionality of database 616. In alternative embodiments, database 616 can be integral to or separate from operational computer 610 and can operate on one or more computers. Database 616 preferably provides non-volatile data storage for any information suitable to support the operation of operational computer 610, including various types of data discussed in the embodiments above, such as, but not limited to, command data 118, movement data 119, expected rate response, actual derived rate response, and error signal 409, for example.

Maintenance interface 618 is configured to allow users to maintain desired operation of operational computer 610. In some embodiments, maintenance interface 618 can be configured to allow for reviewing and/or revising the data stored in database 616 and/or performing any suitable administrative tasks commonly associated with database management. This can include, for example, updating database management software, revising security settings, and/or performing data backup operations. In some embodiments, maintenance interface 618 can be configured to allow for maintenance of processing unit 614 and/or I/O interface 612. This can include, for example, software updates and/or administrative tasks such as security management and/or adjustment of certain tolerance settings.

Processing unit 614 can include various combinations of one or more processors, memories, and software components. Processing unit 614 is configured to perform the tasks similar in form and function to that described with aircraft controls 115 and actuator controls 107. Rate monitor 105 may be programmed to work in conjunction with operational computer 610 as with flight control computer 111 described above to produce steady state rate error signal 409.

The mixing and matching of features, elements, and/or functions between various embodiments is expressly contemplated herein so that one of ordinary skill in the art would appreciate from this disclosure that features, elements, and/or functions of one embodiment may be incorporated into another embodiment as appropriate, unless described otherwise above.

The current application has many advantages over the prior art including the following: (1) new module uses existing outputs of other modules for module inputs; (2) a rate monitor converts oscillatory signals into steady state signals; (3) early detection of servo valve degradation; (4) avoids instrumentation of intermediate stages of hydraulic systems; and (5) the system is less susceptible to nuisance trips.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A system for detecting degradation of a servo valve, comprising:
    a controller for receiving inputs and transmitting command data;
    a servo valve having an actuator, the servo valve being conductively coupled to the controller, so as to receive the command data from the controller and move the actuator in response to the command data;
    a position sensor operably associated with the servo valve for measuring movement of the actuator and for transmitting corresponding movement data to the controller; and
    a rate monitor conductively coupled to the controller for receiving the command data and to the position sensor for receiving the movement data, the rate monitor being configured to process and filter the command data and the movement data within monitor logic, the monitor logic configured to derive an expected rate response and an actual rate response to form an oscillatory rate error signal, the rate monitor filtering the oscillatory rate error signal to produce a steady state rate error signal;
    wherein the rate monitor compares the steady state rate error signal to selected operational limits and produces a telemetry output when the steady state rate error signal exceeds the selected operational limits.

2. The system of claim 1, wherein the controller is a flight control computer and the inputs are from at least one of a pilot and a sub-system for use with an aircraft.

3. The system of claim 1, wherein the controller is flight control computer and the rate monitor is conductively coupled to the existing flight control computer.

4. The system of claim 1, wherein the controller is integral with flight control systems of an aircraft.

5. The system of claim 1, wherein the rate monitor includes software that is integral with software operably associated with the controller.

6. The system of claim 1, wherein the controller is an existing controller and the rate monitor utilizes existing command data and movement data from the controller.

7. The system of claim 1, wherein the controller includes software and the rate monitor utilizes the software of the controller.

8. The system of claim 1, wherein the rate monitor processes the command data to generate the expected rate response for the actuator, and processes the movement data to generate a derived the actual rate response for the actuator.

9. The system of claim 8, wherein the rate monitor compares the expected rate response and the derived actual rate response to generate an oscillatory rate error signal for filtering, so as to produce the steady state rate error signal.

10. The system of claim 1, wherein the rate monitor may be selectively enabled and disabled.

11. A rate monitor for detecting degradation of a servo valve, comprising:
   a monitor logic programmed for receiving command data used to control an actuator in the servo valve, the monitor logic configured to derive an expected rate response from the command data, to receive movement data relating to the movement of the actuator, to derive an actual derived rate response from the movement data, and to produce an oscillatory rate error signal by comparing the expected rate response to the actual derived rate response; and
   a filter for transforming the oscillatory rate error signal to a steady state rate error signal;
   wherein the rate monitor compares the steady state rate error signal to selected operational limits and produces a telemetry output when the steady state rate error signal exceeds the selected operational limits.

12. The rate monitor of claim 11, wherein the filter comprises:
   a plurality of first order filters; and
   a non-linear element.

13. The rate monitor of claim 12, wherein at least one of the first order filters is a high pass filter configured to eliminate steady state mismatches in the oscillatory rate error signal and center the oscillatory rate error signal about zero.

14. The rate monitor of claim 13, wherein the non-linear element converts all negative values of the oscillatory rate error signal from the high pass filter into corresponding positive values.

15. The rate monitor of claim 14, wherein at least one of the first order filters is a low pass filter programmed to operate with the non-linear element to transform the oscillatory rate error signal into the steady state rate error signal, the non-linear element and low pass filter receiving the oscillatory rate error signal from the high pass filter.

16. A method for monitoring the performance of a servo valve, comprising:
   providing a controller for receiving command inputs;
   generating command data with the controller, the command data representing selected movement of an actuator in the servo valve;
   transmitting the command data from the controller to the servo valve and to a rate monitor;
   providing a position sensor;
   measuring the movement of the actuator in the servo valve with the position sensor and generating movement data;
   transmitting the movement data to the rate monitor;
   deriving an expected rate response and an actual rate response of the servo valve to form an oscillatory rate error signal;
   filtering the oscillatory rate error signal to produce a steady state rate error signal; and
   comparing the steady state error signal to prescribed acceptable operational limits of error for the servo valve.

17. The method of claim 16, wherein the oscillatory rate error signal is produced by processing the command data, so as to generate the expected rate response, processing the movement data, so as to generate the actual derived rate response, and comparing the expected rate response to the actual derived rate response.

18. The method of claim 17, wherein the oscillatory rate error signal is transformed into the steady state rate error signal through a filtering process including a plurality of first order filters and a non-linear element.

19. The method of claim 18, wherein the filtering process comprises:
   passing the oscillatory rate error signal through a high pass filter configured to eliminate steady state mismatches in the oscillatory rate error signal.

20. The method of claim 18, wherein the filtering process comprises:
   passing the oscillatory rate error signal through a low pass filter and a non-linear element configured to transform the oscillatory rate error signal into the steady state signal.

* * * * *